United States Patent
Sciscioli et al.

(10) Patent No.: US 11,825,060 B2
(45) Date of Patent: Nov. 21, 2023

(54) FULLY INTEGRATED DIGITAL COLOR MANAGEMENT SYSTEM

(71) Applicant: SUN CHEMICAL CORPORATION, Parsippany, NJ (US)

(72) Inventors: Felice Sciscioli, Sidcup (GB); Danny Rich, Carlstadt, NJ (US); Richard Hayden, Yate (GB); Joachim Lachmann, Niederwangen (CH); Kurt Klaus, Niederwangen (CH); Olga Znamenskaya, Niederwangen (CH); Rainer Hauri, Niederwangen (CH)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/020,183

(22) PCT Filed: Sep. 2, 2021

(86) PCT No.: PCT/US2021/048813
§ 371 (c)(1),
(2) Date: Feb. 7, 2023

(87) PCT Pub. No.: WO2022/051461
PCT Pub. Date: Mar. 10, 2022

(65) Prior Publication Data
US 2023/0291862 A1    Sep. 14, 2023

Related U.S. Application Data

(60) Provisional application No. 63/190,903, filed on May 20, 2021, provisional application No. 63/161,581, (Continued)

(51) Int. Cl.
*H04N 1/54* (2006.01)
*B41F 33/00* (2006.01)
(Continued)

(52) U.S. Cl.
CPC ............ *H04N 1/54* (2013.01); *B41F 33/0045* (2013.01); *G06T 17/00* (2013.01); *H04N 1/6019* (2013.01); *H04N 5/265* (2013.01)

(58) Field of Classification Search
CPC ........ H04N 1/54; H04N 1/6019; H04N 5/265; B41F 33/0045; G06T 17/00
See application file for complete search history.

(56) References Cited

U.S. PATENT DOCUMENTS 5,929,998 A    7/1999    Kettler et al.
6,804,390 B2  10/2004    McClanahan
(Continued)

FOREIGN PATENT DOCUMENTS

CA    2334048    8/2001
CN    103278459  9/2013
(Continued)

OTHER PUBLICATIONS

International Search Report issued in International Application No. PCT/US2021/048813 dated Jan. 4, 2022.
(Continued)

*Primary Examiner* — Christopher Wait
(74) *Attorney, Agent, or Firm* — Marian E. Fundytus; Ostrolenk Faber LLP.

(57) ABSTRACT

The present invention provides a fully integrated digital workflow for the designing and production of packaging. A designer creates a package design with a special effect ink digitally, using a computer connected to a color database and a special effect ink database. Advantageously, the present workflow minimizes the complexity of the workflow by using transparent color layers printed over plain special effect additive ink layers to develop the special effect inks to be used on press. The present workflow advantageously can also be used to assess match of polychromatic inks.

6 Claims, 3 Drawing Sheets

Related U.S. Application Data filed on Mar. 16, 2021, provisional application No. 63/074,614, filed on Sep. 4, 2020.

(51) Int. Cl.
*H04N 5/265* (2006.01)
*G06T 17/00* (2006.01)
*H04N 1/60* (2006.01)

(56) References Cited

U.S. PATENT DOCUMENTS

| | | |
|---|---|---|
| 7,167,246 B1 | 1/2007 | Skierski |
| 7,417,764 B2 | 8/2008 | Rich |
| 7,738,149 B2 | 6/2010 | Rich et al. |
| 9,019,514 B2 | 4/2015 | Rich et al. |
| 9,404,858 B2 | 8/2016 | Schwarz et al. |
| 10,508,208 B2 | 12/2019 | Clauter et al. |
| 10,613,727 B2 | 4/2020 | Beymore et al. |
| 2002/0163640 A1 | 11/2002 | Masuda |
| 2007/0003691 A1 | 1/2007 | Rodrigues et al. |
| 2008/0094638 A1* | 4/2008 | Schwarz ............ G01N 21/4738 356/600 |
| 2017/0176254 A1 | 6/2017 | Ehbets et al. |
| 2019/0078936 A1 | 3/2019 | Bischoff et al. |

FOREIGN PATENT DOCUMENTS

| | | |
|---|---|---|
| EP | 1209630 | 5/2002 |
| JP | 2003-294530 | 10/2003 |
| JP | 3604075 | 12/2004 |
| JP | 2005-326389 | 11/2005 |
| WO | WO 2006/013320 | 2/2006 |
| WO | WO 2007/096402 | 8/2007 |
| WO | WO 2007/149299 | 12/2007 |
| WO | WO 2008/103405 | 8/2008 |
| WO | WO 2013/049796 | 4/2013 |
| WO | WO 2015/023487 A1 | 2/2015 |
| WO | WO 2016/159758 | 10/2016 |
| WO | WO 2018/041727 | 3/2018 |
| WO | WO 2018/165667 A1 | 9/2018 |
| WO | WO 2019/113606 | 6/2019 |

OTHER PUBLICATIONS

Written Opinion of the International Searching Authority issued in International Application No. PCT/US2021/048813 dated Jan. 4, 2022.

International Preliminary Report on Patentability (Chapter 1 of the Patent Cooperation Treaty) issued in International Application No. PCT/US2021/048813 dated Dec. 23, 2022.

D.C. Rich, V. Lovell, R. Marcus and T. Kreutz (2017). "Modeling the Appearance of Metal-like Packaging Printing," *Color Research & Application*, vol. 42, No. 1, pp. 38-49.

Samadzadegan Sepideh: "Printing Beyond Color: Spectral and Specular Reproduction", Feb. 5, 2016 (Feb. 5, 2016), pp. 1-163, XP055874250,Retrieved from the Internet: URL:https://tuprints.ulb.tu-darmstadt.de/5261/1/Disa_for_Publication.pdf [retrieved on Dec. 17, 2021] p. 104-p. 105 p. 110.

* cited by examiner

FULLY INTEGRATED DIGITAL COLOR MANAGEMENT SYSTEM

CROSS REFERENCE TO RELATED APPLICATIONS

The present application is a § 371 National Phase application based on PCT/US2021/048813 filed Sep. 2, 2021, which claims the benefit of U.S. Provisional Application Nos. 63/074,614, filed Sep. 4, 2020, 63/161,581, filed Mar. 16, 2021, and 63/190,903, filed May 20, 2021, the subject matter of each of which is incorporated by reference in their entirety.

FIELD OF THE INVENTION

The present invention is related to the design of packaging printed with special effect inks, and quality control of the special effect printing on press. The present invention provides a fully integrated digital workflow that eliminates the need for physical color swatches at key points of the process.

BACKGROUND OF THE INVENTION

In the printing of product packages, for example tobacco product packages, a complex design is developed by the manufacturer. The designs include custom colors, including special effect inks. The complex design and colors must be reliably and accurately printed during printing of the product packages. Current methods are time-consuming, and require physical samples to verify color match during press runs.

The workflow today is complex and time consuming. The finalized design and a physical mock-up are produced, which is then shared with the prepress department to prepare the artwork and plates that are to be used in the production printing process. The output is a set of files to produce the plates to be used to print the packaging, and, typically, a digitally printed, e.g. inkjet printed, physical swatch version of the artwork to use as a reference. The digitally printed artwork is often submitted to the brand owner or an authorized person for approval. Unfortunately, this digital print often does not represent what is achievable on the printing press, causing a long time for approval on press, and the need of physical persons to approve the packaging at the first production run.

The ink manufacturer receives the request for the preparation of the inks. Often it is possible that the specifications of the requested colors are not correct, or they are incomplete, and/or the color from the design cannot be achieved within the desired printing conditions. For plain, transparent colors it is possible that the target color is a digital reference. However, special effect inks, containing for example metallic/pearlescent additives, are often produced through visually checking a physical sample received by the ink room technicians. It is often necessary to print a physical color swatch printed with the formulated ink so that the color can be shared with other departments in the workflow.

The production (printing) facility receives all of the components needed for the press and organized by the prepress department, the inks prepared by the ink room, and, in most cases, a physical sample for visual approval of the printed packaging. Color control may be with a spectrophotometer, but sometimes unacceptable differences between the expected artwork and the produced product are observed. Because product and brand identity require close conformance to the design specifications, such non-conformances require a significant amount of time for correction prior to the approval of the production run. Production is often subject to these visual approval cycles, which are known to involve large inconsistencies between the color perceptions of the different participants in the production workflow. The Brand owner is often required to be present during the first production for a new product to provide the final approval of any compromises in the design of the printed package. This requires expensive travel and time away from the development of the next new products.

U.S. Pat. No. 7,738,149 relates to a system and method for electronically communicating, coordinating, and disseminating product designs, specifications, and production-related data between a plurality of parties. Halftone printing is used to match the target colors.

U.S. Pat. No. 7,417,764 provides a plurality of representations of color that are stored in an electronic color library and that can be selected by a user. A plurality of color ink formulas and/or colorant formulas capable of producing a selected color are provided. Other selections can be made to define a substrate or other criteria that can impact the color ink formulas. The selected color ink formula(s) or colorant formula(s) can be transmitted over a communications network, such as the internet, to another party, such as an ink manufacturer.

U.S. Pat. No. 9,019,514 discloses a system and method for producing a wide range of metallic appearances using halftone printing of a nano-particle metallic ink, such as nano-silver. A nano-silver metallic ink can be made to produce a range of appearances, for example from bright silver to dull oxidized aluminum, by changing the halftone printing level of the silver inks, changing the substrate surface properties and introducing small amounts of other colored inks, in either an under-printing or over-printing of the metallic ink.

EP 3048589 describes an instrumental method for making measurements on optically variable inks, such as those used in security applications. The instrument has a moveable detector and two light sources at different angles relative to the specimen normal.

WO 2007/096402 (English counterpart of JP 2009-527752) discloses a method for analyzing paint film with effect pigments, using a colorimeter and a camera with polarizing filters and the ability to change the angular orientation of the light source and sensors. The crossed-polarizers block light from the surface of the coatings, but not from the flaked pigments. Readings of the images and color can be captured from directions very close to (less than 5°) the specular direction. The method is useful for use in matching automotive paint used to repair body damage to the original color of the vehicle.

US 2008/0094638 (English counterpart of JP 5758367) discloses a method and apparatus for inspecting surfaces containing effect pigments. The invention utilizes an instrument with a plurality of sensors and sources around the specular direction. The plurality allows the instrument to separate the surface gloss from the specular reflectance of the flake pigments.

U.S. Pat. No. 9,404,858 discloses a method and apparatus for determination of surface properties of coatings by determining contrast of an evaluated image. This patent describes the use of a spatially resolved color imaging system that can document how the color of an effect coating changes at angles slightly away from the specular direction or the diffuse direction.

WO 2019/113606 describes the use of a database of known colors and colorant formulas. Both area averaged color and pixel by pixel image captures are used to retrieve the correct recipe. The camera or image capture device does not have to be physically attached to the area averaging sensor. Examples include the use of a portable camera such as an iPhone or other portable imaging device.

U.S. Pat. No. 5,929,998 (English counterpart of JP 3996677) discloses a process for matching coatings containing effect pigments either to match a color in the field, or to correct production color errors. Multi-angle spectrophotometers are used to generate the needed color information.

U.S. Pat. No. 6,804,390 discloses a method and apparatus for color matching, in which paint recipe neural networks are utilized. The color of a standard is expressed as color values. An input layer receives input data related to paint bases. The output layer is related to color values. The paint color matching neural network can be used for color formula correction, matching from scratch, effect pigment identification, selection of targets for color tools, searching existing formulas for the closest match, identification of formula mistakes, development of color tolerances, and enhancing conversion routines.

US 2019/0078936 (English counterpart of EP 3368872) describes a method utilizing a neural network to predict visual texture parameters of a paint with a known paint formulation.

US 2017/0176254 (English counterpart of EP 3184990) discloses a device for radiometric measurement of the surface of a test object, wherein the test object comprises a substrate with embedded effect pigment or flakes. Platelet-like effect pigments act in the embedding substrate or medium like the smallest mirrors, and reflect the incident light, to produce a glitter or sparkle effect.

WO 2018/041727 (also published as EP 3500830) discloses a computer-implemented method for identifying an effect pigment by measuring the sparkle point distribution geometry of a digitally captured image, and using the data to identify the special effect pigment that is used in the sample pigment.

WO 2006/013320 describes a method for measuring the lustre of a surface having a metallic appearance. The method comprises measuring the CIELAB coordinates in the specular included mode, and in the specular excluded mode. The CIELAB coordinates are converted into their tristimulus values, and the tristimulus values are converted into a lustre measurement for the surface.

JP 2005-326389 discloses a method for determining the color of a metallic coating at a desired angle. The spectral reflectance of the metallic coating is measured at five standard angles, and a regression analysis is done to extrapolate the spectral reflectance at any desired angle.

CA 2334048 describes a computer color matching apparatus comprising a colorimeter, a micro-brilliance measuring device, and a computer. Color data and micro-brilliance data of paints and paint blends are stored on the computer. The color data and micro-brilliance of a reference color are measured, and compared to the data of the paints/paint blends to find the best match.

US 2002/0163640 (English counterpart of JP 4623842) discloses a procedure for preparing an electronic database of metallic colors, and algorithm that searches for the approximate color of any metallic paint color according to a pre-created color classification code.

JP 2003-294530 provides a means for calculating a proper compounding ratio between a coloring agent and a brightening agent when performing color matching to a sample color of a metallic pearl color. Color values are measured using a multi-angle spectrophotometer.

U.S. Pat. No. 10,613,727 discloses a method wherein texture is used to describe the unique reflectivity of a metallic coating. A computerized method for displaying matches of a paint sample to various proposed paint coatings includes receiving one or more coating texture variables of a target coating from a coating-measurement instrument. The method also includes displaying effect texture ratings for multiple respective proposed coating matches on a digital display device. The effect texture ratings indicate a similarity between the one or more coating texture variables of the target coating and respective coating texture variables of each of the respective proposed coating matches. The method also includes ordering the proposed coating matches, wherein the ordering indicates a strength in similarity between the target coating and each of the proposed coating matches with respect to the effect texture ratings.

WO 2008/103405 (English counterpart of EP 2130013) is directed to a method for producing one or more ink formulas to match the color and appearance of a target coating containing flakes. The method utilizes an imaging device that reads the spatial distribution of light flux around a given set of illumination angles. The patent describes how to identify what flakes are present, and in what size and concentration, in a coating. The method provides automatic selection of colorants and flakes for producing one or more ink formulas to match the color and appearance of a target coating.

CN 103278459 provides a method for detecting the gravure pearly-luster ink hue, comprising: printing a standard ink sample and the pearly-luster ink sample at the same temperature and viscosity. An integrating sphere spectrophotometer is used to determine CIE delta E values. The values of the pearly-luster ink sample are compared to the values of the standard ink sample.

U.S. Pat. No. 7,167,246 provides a method of color matching metallic paint, utilizing a library or collection of different types of metallic pigments and a library or collection of different types of colorants. The metallic pigments can be composed of aluminum or other types of metal, and can have a variety of different shapes, such as a cornflake-type shape or a silver dollar-like shape. The colorant library includes a black colorant and a plurality of non-black colorants. The colorant library does not include a white colorant. The standard metallic pigment is mixed with each one of the non-black colorants in a vehicle to form a plurality of binary metallic characterization mixtures. The black colorant is mixed with the standard metallic pigment in a vehicle to form a binary black metallic characterization mixture. An integrating sphere spectrophotometer is used to measure the spectral reflectance curve of a sample ink, which is compared to the libraries.

WO 2016/159758 (English counterpart of NL 1041256) discloses a method for preparing color swatches to demonstrate a product color. The color swatches are prepared by printing energy curable inks on a suitable substrate.

JP 3604075 describes a method using computer color matching (CCM) of a printed production lot ink to a printed standard ink. The color values are compared using CCM, and adjustments are made to the production lot ink as necessary.

WO 2007/149299 and US 2007/0003691 (English counterparts of EP 2036047 and JP 2008-540089) describes a process using a computer-implemented method for determining the correct paint formulation to refinish or repair a damaged paint area on a vehicle. The color code which contains the color data values of the original paint is entered into a computer containing a color cluster database. The color clusters associated with the color code of the original paint are identified, and color chips provided. A color chip having the closest color match to the original paint is determined visually.

EP 1209630 (English counterpart of DE 60117905) discloses a process for generating a computer image of a 3D object provided with a special effect coating, such as car bodies. The process comprises: coating a test panel; taking a plurality of angle-dependent colorimetric measurements of the coating; storing the colorimetric data in a datafile with assignment of the corresponding angles; faceting the visible surface(s) of a 3D object by computer into a number of flat polygonal areas small enough to represent the surface topography; and assembling the polygonal areas into a computer image of the 3D object with a visually perceptible special-effect coating thereon.

WO 2013/049796 is directed to a system for matching color and appearance of a target coating of an article. The system comprises a color measuring device, a sparkle measuring device, a color database, a computing device, and a computer program product that causes the computing device to perform a computing process for color matching. The computing process comprises steps utilizing the sparkle values of the target coating, the color data of the target coating, and the flop values based on the color data, to identify and select matching formulas based on sparkle differences, flop value differences, and color difference indexes. The system can be used for matching color and appearance of target coatings having effect pigments. The system can be particularly useful for vehicle refinish repairs.

U.S. Pat. No. 10,508,208 discloses a process for printing multicolored printed images. The process uses exclusively interference pigments for the colored pigmentation of the printing inks. Also disclosed are printed products produced using the process, the use of the process, and suitable interference pigments.

D. C. Rich and colleagues have recently described a parameter, the "brilliance index" to model the appearance of metal-like packaging printing. See D. C. Rich, V. Lovell, R. Marcus and T. Kreutz (2017). "Modeling the Appearance of Metal-like Packaging Printing," *Color Research & Application*, vol. 42, No. 1, pp. 38-49. They showed that the visual perception of brilliance is correlated with the ratio of reflectance that is due to specular reflection. For a printed metallic ink, the higher the ratio of specular reflectance, the higher the perceived brilliance of a print.

None of the prior art discloses a fully digital workflow for the printing of packaging of various products. Thus, there is still a need in the art to have a more efficient, digital, workflow from the beginning at the design stage, all the way through to production of the packaging.

BRIEF SUMMARY OF THE INVENTION

The present invention provides a method for a fully digital workflow for printing packaging with designs that include special effects, such as metallic effects. The present invention eliminates the need to have a physical sample of the desired target color at various stages of production, such as, for example, during the press run, when the actual packages are printed. Consequently, many of the identified complexities, caused by the subjective perception of the color and appearance of the proofs and the final prints, may be simulated digitally.

In a particular aspect, the present invention provides a method of creating a digital rendering/simulation of a target special effect custom ink color, comprising:

(a) providing a 3D digital display computer monitor adapted to display the design, connected to a computer having artwork visualization software installed;
(b) providing a digital special effect library comprising a look-up table of special effect additive samples, each sample having luminous reflectance factor Y measured in the specular-included mode (YSPIN), luminous reflectance factor Y measured in the specular-excluded mode (YSPEX), and brilliance index (BI) values, wherein each special effect sample is identified with a unique identifier special effect sample code, and a visual rendering of each special effect sample can be displayed on the 3D digital display;
(c) providing a digital color library comprising a look-up table of color samples, wherein each color sample is a transparent color, each color sample having associated CIELAB Cab spectral reflectance data, wherein each color sample is identified with a unique color sample code, and a visual rendering of each color sample can be displayed on the 3D digital display;
(d) wherein the computer is connected to the digital special effect library and the digital color library;
(e) using the computer and the 3D digital display, digitally overlaying a selected color sample over a selected special effect sample; and
(f) digitally recording the selected color sample code and selected special effect sample code; wherein the combination defines a digital target special effect custom ink color sample.

In another aspect, the present invention provides a method of creating a digital special effect library.

In a further aspect, the present invention provides a method for confirming that a press production special effect ink matches a target special effect ink.

These and other objects, advantages, and features of the invention will become apparent to those persons skilled in the art upon reading the details of the formulations and methods as more fully described below.

BRIEF DESCRIPTION OF THE DRAWINGS

FIG. 1A illustrates specular reflection.
FIG. 1B illustrates diffuse reflection.
FIG. 2 illustrates a simplified print construct displayed on the 3D digital display in the design phase of the present invention. The construct includes a substrate selection (4), on which is printed a special effect additive ink (3), a transparent colored ink (2) printed on the special effect additive ink, and an OPV (1) printed on the transparent colored ink.
FIG. 3 illustrates a print construct during production printing. The construct includes a substrate (4), on which is printed an ink blend (5) formulated to spectrally match the transparent colored ink (2) printed on the special effect additive ink (3), and an OPV (1) printed on the ink blend.
FIG. 4 shows the steps involved in determining whether a special effect ink printed on press matches a target printed special effect ink.

DETAILED DESCRIPTION OF THE INVENTION

Figure 1A:
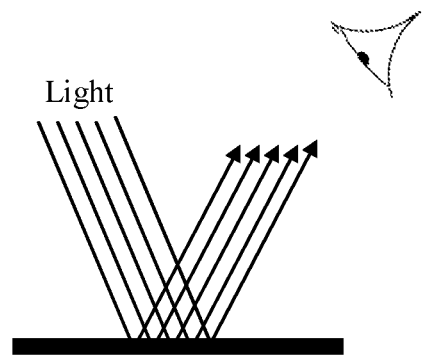
FIG. 1A.

The present invention provides a fully digital workflow that will solve many of the issues involved with the current protocols for achieving acceptable production of packaging.

Several of the problems, and the solutions provided by the present invention, are shown in Table A.

TABLE A

Workflow improvements

| PROBLEM | SOLUTION |
| --- | --- |
| Large investment of money and time to produce a physical mock-up of the predicted artwork | Digital workflow: artwork is imported in a 3D simulation and display software, where visual appearances (colors/effects) are specified using digital libraries of special effect inks, achievable color targets, finishing coatings (OPV—over printing varnishes), embellishment effects, and substrates |
| There are many complexities in the processes related to the achievability of the predicted artwork | Standardisation of the materials and a simplification of the printing structure allows for exact simulation of the optical properties of the printing |
| Special effect inks comprised of multiple layers of inks, some absorbing and some appearance modifying can only be formulated visually and only by having a physical sample of the desired packaging | Implementation of the Brilliance Index in the analysis of the total surface appearance where special effect inks are printed provides a factor that has been shown to be strongly correlated to visual appearance of metal and interference flake pigments. |
| Special effect inks comprised of mixtures of absorbing pigments and goniochromic pigments can be formulated visually and only using a physical sample of the desired packaging | Measurement of the Brilliance Index of the special effect (metallised flake, pearlescent flake or polychromatic mixtures of flaked pigments and conventional pigmented) inks, printed on uncoated paper with a specified proofing process, is able to identify the both the appearance and the amount of the special effect pigments. |
| Color approval must be in person, using skilled visual methods, using physical samples | Use of digital color libraries, made by achievable color targets, shared across the full workflow using a cloud based system |
| Color approval is in person, visual, using physical samples | Using Measure Brilliance Index and SPIN/SPEX readings we can control consistency of the special effect inks and understand how to manage corrections of the special effect ink on press |

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are various production substrates and uncoated paper.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "inks and coatings," "inks," and "coatings" are used interchangeably, and refer to compositions of the invention, or, when specified compositions found in the prior art (comparative). Inks and coatings typically contain resins, solvent, and, optionally, colorants. Coatings are often thought of as being colorless or clear, while inks typically include a colorant.

As used herein, "reflectance" is the amount of radiation reflected from a surface compared to the amount of incoming radiation.

Figure 1B:
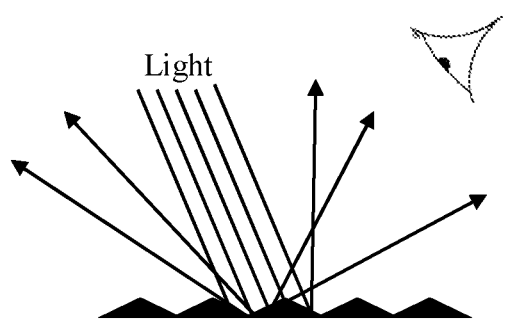
FIG. 1B.

As used herein, "specular reflectance," "specular reflection," and the like refer to light reflected from a surface at a definite angle from a surface, generally at an angle equal to but opposite of the angle of the light illuminating the surface. FIG. 1 shows specular reflectance. Smooth surfaces will have a higher specular reflectance than rough surfaces.

The higher the specular reflectance, the brighter, or more brilliant, the surface appears, and the color appears more vivid.

As used herein "diffuse reflectance," "diffuse reflection," and the like refer to when light is scattered in various directions. Diffuse reflection of light occurs more strongly on rough, textured, and irregular surface conditions, making an object appear less saturated and duller in color.

In the present invention, reflectance is measured using a spectrophotometer. The reflectance can be measured such that both the specular and the diffuse reflection are included, referred to as "SPIN-mode," which may be referred to in the art as "d8i", "di:8°" or "SCI." Or, the reflectance can be measured such that only the diffuse reflection is included, referred to as "SPEX-mode," which may be referred to in the art as "d8e", "de:8°" or "SCE."

As used herein, "CSCI" refers to the metric chroma, CIELAB C*ab, of a printed ink or coating measured in the SPIN-mode.

As used herein, "CSCE" refers to the metric chroma, CIELAB C*ab, of a printed ink or coating measured in the SPEX-mode.

As used herein, the "chroma index" or "CI" of a printed ink or coating refers to the ratio of the metric chroma that is attributable specular reflection.

As used herein, "brilliance index" or "BI" refers to the amount of reflection of a printed ink or coating containing only special effect additive (i.e. no absorbing pigments) that is attributable to specular reflection.

Color Management System

The present invention provides a digital workflow, in which many of the identified complexities, caused by the subjective perception of the color and appearance of the proofs and the final prints, are simulated digitally. A fully digital definition, at the design level, of what colors and appearances are achievable in the artwork produced by the intended printing conditions are used to guide the designer and to set expectations before leaving the design phase of the workflow. Then, all production approvals, currently made by a person on site, can be made remotely, through the implementation of a fully digital workflow, utilizing visualization software, measurement hardware, and cloud-hosted databases, along with modern color displays (such as 3D graphic monitors), color measurement instruments, color-matching and color control programs.

In a first embodiment of the present invention, the digital workflow will be the simulation of the plain, transparent color ink layer printed over: the appropriate packaging substrate layer, a metal flake pigmented ink layer, a pearlescent flake pigmented ink layer, any interference flake pigmented ink layer, foil layer, foil-like ink layer, or combinations thereof, on the 3D color display. Optionally, the first embodiment will include an overprint varnish layer printed over the plain, transparent color ink layer. Each of the layers are provided as a series of samples with unique identifier codes. The workflow of the present invention gives the ability to identify each of the materials digitally by a qualitative and quantitative perspective. This allows the suppliers of the materials to verify the conformance to requirements prior to shipping the materials to the printing (press or production) factory. Thus, this eliminates the possibility that complexities associated with conventional methods will cause unnecessary costs, and a significant time investment in the process of taking a design-to-press.

In a second embodiment of the present invention, the digital workflow provides a method to determine the composition of blended inks that contain mixtures of traditional absorbing pigments and special effect flaked pigments. The conventional prior art methods require complex and expensive instrumentation, known as goniospectrophotometers, to achieve this step. Goniospectrophotometers utilize multiple angles of illumination and/or viewing of the printed packaging. In contrast, this step is achieved in the present invention by separation of the diffusely reflected light from the specularly reflected light, quantified by a Brilliance Index.

The present invention includes, but is not limited to, the following process improvements in the printing of packaging for brand products:

A fully digital workflow in which artwork is imported into a 3D simulation display software, where visual appearances, such as colors and special effects, are specified using digital libraries of colored inks and special effect inks printed on standard packaging materials, along with the list of achievable color targets and any finishing steps, such as coatings or overprint varnishes (OPV), and embellishment effects such as textures, embossments, etc.

Standardization of all materials and the simplification of the printing structure by providing a full definition of the processes and resulting effects on the final appearance of the packaging.

The ability to control the appearance of special effect printing through the implementation of a brilliance index at all stages of the design and production process for the evaluation and analysis of the printed areas where special effect inks are printed. Brilliance index is not traditionally used at any stage of the design or production process (e.g., including, but not limited to, the press room, proofing, ink room, etc.).

The use of digital color libraries with color targets that are produced using achievable color inks on actual product substrates. These libraries, hosted in the cloud-based databases, are shared across the full workflow so that at each step, the expected appearance can be reviewed and confirmed. This maintains the expectations and provides the ability to review and approve the printing job remotely.

Figure 2:
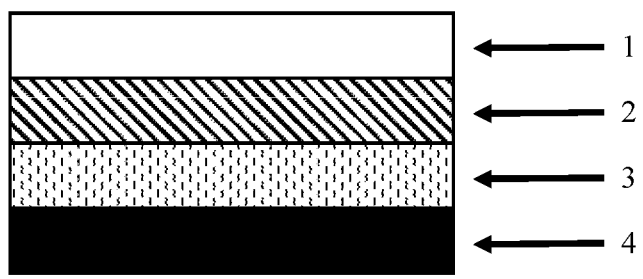
FIG. 2.
Figure 3:
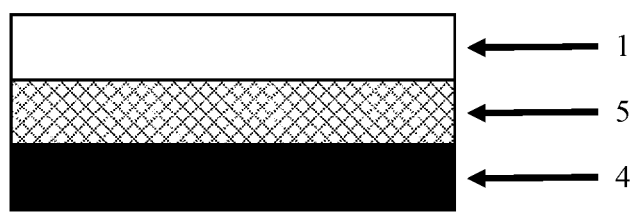
FIG. 3.
Figure 4:
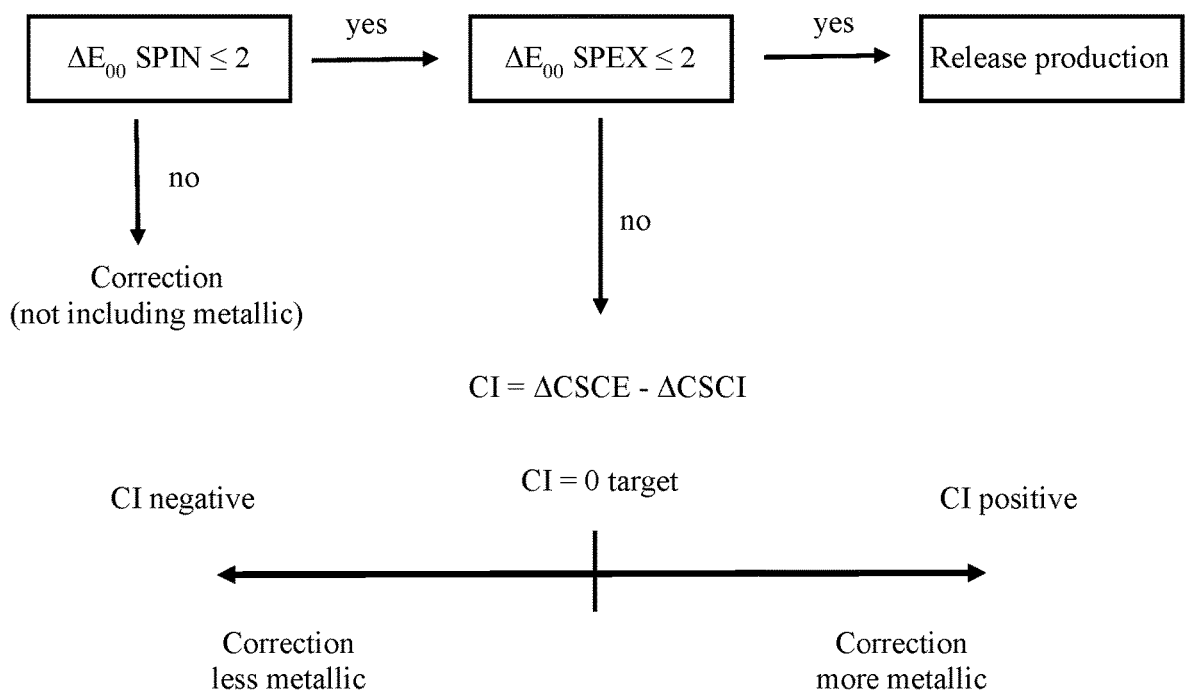
FIG. 4.

To achieve the features described above, the present invention utilizes the implementation of certain processes. In one embodiment, the printing process must be simplified, eliminating the option of mixing colored bases into metallic and pearlescent inks, which mixing produces a nearly infinite number of possible combinations. Rather, according to one embodiment of the present invention, metallic and pearlescent inks are plain, and will be used only as background for transparent inks. This simplification is shown in FIG. 2. This simplification is a result of the incorporation of a 3D computer display solution capable of simulating the overprinting of transparent colored inks onto metallic and pearlescent inks, which display may not be suited for predicting the optical properties of a blend of special effect pigments and absorbing pigments in an ink. Advantageously, in another embodiment of the method of the present invention, use of the Brilliance Index and Chroma Index can also be used to design, predict, and evaluate optical properties of polychromatic inks (i.e. inks formulations that include a blend of color bases and special effect additive products). This construct is shown in FIG. 3.

The present invention also provides a standardization of the materials used in packaging printing (e.g. tobacco packaging printing). Conventionally, too many materials are used in this workflow. In the packaging industry for tobacco, for example, many different pearlescent, silver, and gold pigments are supplied which may then create many different combinations in the finished inks. This large number of materials makes the use of a cloud-based library inefficient. Without a definition of a restricted set of components, it will never be possible to move the workflow into a simple and effective solution. The present invention limits the number of materials available in cloud-based databases to facilitate the selection and digital simulation of packaging designs. Although this may be considered as limiting the creativity for the designers, it is a clear requirement in support of a fully digital workflow.

In another aspect of the present invention, the fully digital workflow makes it possible to develop new packaging designs using the 3D display where the standardized set of plain transparent colored inks and special effect materials will be available. The transparent ink color samples each have a unique identifier code stored in a digital database. Each special effect additive is presented in a series of concentrations, each of which have a unique identifier code stored in a digital database, enabling the designer to choose a specific special effect additive at a specific concentration. Consequently, it will be possible for the designer to visualize, on a calibrated monitor, what the final appearance of the packaging will be, without the need to produce a physical mock-up.

Physical selection catalogues of the special effect additive compositions are correlated with the digital look-up tables. All of the brilliance index values will be available, giving the designer the option of selecting known special effect additive compositions from the beginning of the workflow. Thus, the designer can identify which material should be used in the special effect ink.

The method of the present invention provides efficient, digital, transmittal of the ink and design information to the pre-press stage of the workflow. Using the information, the pre-press team finalizes the elaboration of the artwork, and gets it ready for printing of a barrel proof. Then, the fingerprint (i.e. color and brilliance index values) will be used as input in the press specifications. The present invention supports the pre-press phase of the workflow with the preparation of all digital colors to implement in the artwork where needed. With a knowledge of which special effect material, and at what concentration, should be used, the press specifications can be easily predicted at this stage. Using real, achievable transparent ink colors will be easy to predict and simulate the final appearance of the packaging.

The method of the present invention enables the ink supplier to provide the correct materials to the printing factory. Because there are digital definitions of all required appearances, the ink supplier can look up or produce the required recipes of the transparent standard inks, and then use the brilliance index value to identify the correct special effect inks on the substrates being utilized by the printing factory to produce the packaging. Advantageously, by printing on uncoated paper, in addition to identifying the correct special effect additive, the present invention provides a method to define the amount of the special effect additive material. Thus, the evaluation of a test or press print is quantitative.

Colors are communicated digitally via the internet or from a cloud-based database using a standard color exchange formatted (CxF) data file. This part of the present invention then eliminates the need to prepare and share color swatches which may or may not represent the actual printing conditions. This fully digital workflow allows the ink supplier to achieve all desired targets, getting the colors right on the first attempt on press.

Because the inks and the design have all been developed using this digital workflow, the printing factory will be able to use the same digital data to validate the printing at the press-side, and, using the cloud-based databases upload the verification results to the workflow, allowing digital feedback to the packaging buyer and the design teams.

The appearance of a special effect ink, such an ink containing a metal flake pigment, can be assessed by calculating the brilliance index (BI). To determine the BI of a special effect pigment at different concentrations, a series of ink compositions containing only the special effect pigment and vehicle, i.e. no absorbing pigments, is prepared. The inks are printed on a substrate, and the spectral reflectance measured in both specular-included (SPIN) mode, and specular-excluded (SPEX) mode. As explained above, the visual perception of brilliance is correlated with the ratio of reflectance that is due to specular reflection. Using a sphere spectrophotometer, the luminous reflectance factor Y is measured in the specular-included mode (YSPIN) and the specular-excluded mode (YSPEX). The brilliance index (BI) of each print is calculated according to the following formula:

$$BI=[(YSPIN-YSPEX)/YSPIN] \times 1000$$

The inks can be printed on any substrate, such as a production (packaging) substrate, or uncoated paper. Because production substrate features (such as roughness, etc.) can affect specular reflection, the BI of the special effect ink per se can be standardized by measuring the inks printed on uncoated paper. Each series of special effect additive alone inks is printed on one or more production substrates as well as uncoated paper, and the BI for each calculated. Thus, each special effect additive ink (i.e. each concentration of special effect additive) will be associated with a cluster of BI values, one for each of the production substrates and uncoated paper. This enables the BI of the ink on any production substrate to be correlated with its BI printed on uncoated paper. In this way, a test print on uncoated paper can be used to predict the appearance on a production substrate. Each print is assigned a unique special effect sample code. These unique codes and the related data, for example BI, are stored in a "digital special effect library database". The digital special effect library comprises a look-up table of special effect additive samples, each sample having luminous reflectance factor Y measured in the specular-included mode (YSPIN), luminous reflectance factor Y measured in the specular-excluded mode (YSPEX), and brilliance index (BI) values, wherein each special effect sample is identified with a unique identifier special effect sample code, and a visual rendering of each special effect sample can be displayed on the 3D digital display. Using any known graphic, photo, or other art visualization software, each special effect sample can be displayed as a special effect sample "color" swatch on a 3D display, such as a 3D computer monitor.

To determine the concentration of special effect additive in a press ink, the BI of the press ink can be compared to the BI of the desired concentration determined as described above. The BI of the press ink is calculated as described above. The desired special effect ink target print, with its related special effect sample code is selected. The target print may be a special effect ink composition printed on a production substrate. Because the target print on a production substrate is directly associated with the same ink printed on uncoated paper, the BI of the ink printed on uncoated paper can be used as a comparator. The BI of the target ink printed on uncoated paper is termed $BI_{target}$. It is easier to print test runs on uncoated paper as a standard protocol, than to print test runs on production substrates. The only substrate necessary to have available for testing is uncoated paper, simplifying the test process. A sample of the press ink, or the ink being used in a laboratory proofing test, is taken, and printed on uncoated paper. The luminous reflectance factor Y is measured in the specular-included and the specular-excluded modes, to give $\text{YSPIN}_{press}$ and $\text{YSPEX}_{press}$ of the press ink, and the brilliance index ($\text{BI}_{press}$) calculated, as described above. To determine if the press ink matches the desired target ink, the brilliance index difference ($\Delta\text{BI}$) is calculated. Preferably, the $\text{BI}_{press}$ is within about 10% to 20% of $\text{BI}_{target}$, most preferably within 10%. The $\Delta\text{BI}$ between the press print and the target is calculated according to the following formula:

$$\Delta\text{BI}=[(\text{BI}_{press}-\text{BI}_{target})/\text{BI}_{target}]\times 100$$

wherein:
the target value of $\Delta\text{BI}=0$;
a tolerance range for $\Delta\text{BI}=0\pm 10\%$;
a negative value, wherein $\Delta\text{BI}<-10\%$, indicates that the amount of special effect additive in the ink formula must be increased for printing on press; and
a positive value, wherein $\Delta\text{BI}>+10\%$, indicates that the amount of special effect additive in the ink formula must be decreased for printing on press.

To design a special effect printed packaging, a designer will use a 3D display computer monitor adapted to display the design, connected to a computer having artwork visualization software installed. The computer will be connected to the digital special effect library comprising a look-up table of special effect additive samples described above. The computer will also be connected a digital color library comprising a look-up table for color samples, wherein each color sample is a transparent color, each color sample having associated CIELAB $\text{C}^{*}_{ab}$ spectral reflectance data, wherein each color sample is identified with a unique color sample code, and a visual rendering of each color sample can be displayed on the 3D digital display. The digital color library used is not limited, and can be any digital color library currently known, or developed in the future. For example, the digital color library includes, but is not limited to, PantoneLIVE/myColorCloud. Using the computer and 3D digital display, the designer will overlay a selected color sample over a selected special effect sample. This is repeated until the designer is satisfied with the appearance of the design. When the designer is satisfied with the design, the selected color sample code and the selected special effect sample code is digitally recorded, wherein the combination defines a target special effect custom ink color sample.

Using the selected color sample code and selected special effect sample code of the target special effect custom color ink, the target special effect custom color ink can be prepared. The ink color formula that matches the color sample code is prepared, and the special effect ink composition that matches the special effect sample code is mixed with the ink color formula. The mixed ink is the target special effect custom color ink. The target special effect custom color ink is printed on the intended production substrate, to produce a barrel proof. A sphere spectrophotometer is used to measure the metric chroma $\text{C}^{*}_{ab}$ in the specular-included mode ($\text{CSCI}_{target}$), and the $\text{C}^{*}_{ab}$ in the specular-excluded mode ($\text{CSCE}_{target}$). The metric chroma for the target special effect custom color ink are digitally recorded, and stored in a digital look-up table of special effect custom color inks. Each target special effect custom color ink is assigned a unique custom color ink identification code.

Parameters such as total color difference ($\Delta\text{E00}$) and/or brilliance index (BI) are archived for traceability and quality control in future printing runs. Spectral reflectance color values are measured by methods well-known in the art, using spectrophotometers, preferably sphere spectrophotometers. As discussed earlier, there is both specular reflection and diffuse reflection. Total color is affected by both specular and diffuse reflectance, and is measured in both the SPIN-mode and the SPEX-mode. The presence of flaked effect pigments, such as metallic or pearlescent pigments, impacts the specular reflection more than the diffuse reflection. For example, when comparing prints of two inks of the same color, if the concentration of metallic flakes is essentially the same, the color values for the two prints will be very similar in both the SPIN- and SPEX-modes. However, if one of the inks has less metallic flake, the inks may be matched when measured in the SPIN-mode, but the ink with less metallic flake will be darker and more chromatic when measured in the SPEX-mode. When the amount of flaked pigment of the test print is correct, the difference between the modes will be diminished, and a visual match will be achieved.

To assess the special effect color match, the CIELAB metric chroma for each of the SPIN- and SPEX-modes are determined. Measurement of color using the CIELAB system is well-known in the art. The metric chroma is given the symbol $\text{C}^{*}_{ab}$ for the CIELAB color reference space, and describes the vividness or dullness of a color—that is, how close the color is to either gray or the pure hue ("a" is the red/green scale, and "b" is the yellow/blue value). Given that all of the computations used herein are based on the CIELAB space, the superscript "*" and the subscript "ab" may be omitted, and notation to identify the measurement used. The term "CSCE" means the metric chroma for the SPEX-mode readings, and the term "CSCI" means the metric chroma for the SPIN-mode readings. As a hypothetical example, a metallic flake containing reference color will have a CSCI of 68.7 and a CSCE of 73.3. The same ink without any metallic flake pigment will have a CSCI of 69.6, nearly identical to the reference metallic color; but, this same ink will have a CSCE of 81.2, a difference of 8 steps in metric chroma to the reference metallic color. As the amount of flake pigment is added to the matching ink recipe, the metric chroma difference between the reference color and the test color under the two conditions decreases. When the concentration has been adjusted correctly, the AC will be small, and the total color difference $\Delta\text{E}_{00}$ will also be small for both measurement modes.

To assess whether the transparent color (i.e. the color without adjustment for metallic pigment) of the test ink (such as a press or print ink) is a match to the target print, the color difference between the test and target print is assessed in the SPIN-mode ($\Delta\text{E}_{00}$ SPIN). A preferred tolerance for the color difference between the test and reference colors is preferably less than 2 color units. If the $\Delta\text{E}_{00}$ SPIN is more than 2 color units, the transparent color must be adjusted until the $\Delta\text{E}_{00}$ SPIN is within 2 color units. The next step is to assess whether the test ink has the correct concentration of special effect additive. To assess whether the test ink has the same concentration of metallic pigment, the metric chroma are measured in the SPEX-mode. If the color difference measured in the SPEX-mode Woo SPEX) is also within 2 color units, then the test ink is an acceptable match to the target ink. However, if $\Delta\text{E}_{00}$ SPEX is greater than 2 color units, then the amount of special effect additive (e.g. metallic pigment) in the test (press) ink must be adjusted. For the purposes of calculation, the metric chroma of the test ink measured in SPEX-mode is termed "$CSCE_{print}$", and the metric chroma of the test ink measured in SPIN-mode is termed "$CSCI_{print}$." The digitally stored metric chroma for the target ink are termed "$CSCE_{target}$" and "$CSCI_{target}$." When correction is required, the difference between the test and target inks is calculated as Chroma Index (CI), according to the following formula:

$$CI = \Delta CSCE - \Delta CSCI$$

wherein:
  $\Delta CSCE = CSCE_{print} - CSCE_{target}$;
  $\Delta CSCI = CSCI_{print} - CSCI_{target}$
  the target value of CI=0;
  a negative value for CI indicates that the amount of special effect additive in the press ink formula must be decreased; and
  a positive value for CI indicates that the amount of the special effect additive in the press ink formula must be increased; and
increasing or decreasing the amount of special effect additive in the press ink formula, and repeating step ii. until $\Delta CSCE$ is within ±10% of $\Delta CSCI$, calculated according to:

$$[(\Delta CSCE - \Delta CSCI)/\Delta CSCI] \times 100 = 0 \pm 10.$$

The methods of the present invention provide a fully digital workflow, by providing a set of digital information from which an ordinarily skilled person can:
  Successfully run a color match of an ink containing metallic/pearlescent/polychromatic pigments without the need of having a physical sample from the master production batch for a visual approval of the special effect or the use of an expensive goniospectrophotometer.
  Control the consistency of the printing of the special effect ink during production.

Following the approval of a special effect color, during the first master batch production run for a packaging print, and having the ink used for it containing metallic or pearlescent materials, one can standardize the information related to the ink, and save the information in a digital special effect ink color database. Information such as color appearance (measurement from a spherical or hemi-spherical diffuse spectrophotometer), printing condition, unique custom color ink identifier code, and the BI of the special effect ink printed on uncoated paper with a specified proofer can be stored. The BI and metric chroma data of the target special effect custom color ink printed on the intended packaging substrate can also be archived in a digital cloud database.

To reproduce the special effect ink for all following productions, the press conditions information must be known, as well as the settings needed on the laboratory ink proofer, and the SPIN-mode color measurement in order that one can correctly reproduce the appearance of the color. Printing the predicted ink on the same uncoated paper, and using the same specified proofer used for the standard, one can measure the BI value from the proof, compare to the value recorded for the standard, and control the amount of special effect material in the ink. The formula is optimized step by step, reducing as much as possible the color and BI differences between the digital data recorded for the standard and the new measurements from the produced sample.

Color consistency in production can then be ensured using the BI and SPIN and SPEX digital color measurements taken from the master printed packaging. Utilizing the differences between master and batch information, one can control the production so that it is in tolerance both in terms of the color (using SPIN-mode color measurement) and in the appearance modulated by the amount of special effect material (using a combination of the BI, SPIN-mode and SPEX-mode spectral reflectance measurements), and to understand how to modify the ink on press if needed.

EXAMPLES

The invention is further described by the following non-limiting examples which further illustrate the invention, and are not intended, nor should they be interpreted to, limit the scope of the invention.

A series of special effect inks were printed on production substrate (ICL coated paper) and uncoated paper. Each special effect ink print was compared to a target (master batch or reference) printed ink.

Sets of special effect inks were prepared, with a reference ink, and test inks at higher and lower concentrations of special effect additive.

Printing

Each ink was printed on either ICL coated paper (ICL Invercote Lenato paper 240 g/m²—a production substrate) or uncoated paper. An overprint varnish (OPV) layer was applied to some of the prints on ICL coated paper.

Printing on ICL coated paper was done using a Barrel Proof Machine, using the following specifications:
  Cylinder Specification:
  Cylinder 1
  For Pearls—mechanical engraved 70/0° 120°, 16.2 ml/m³
  For Silvers—laser exposed etched 80/25°, 31 μm, 21.0 ml/m³
  Cylinder 2
  For Lacquer (OPV)—mechanical engraved 80/0° 130° (solid)

Printing on uncoated paper was done with a handproofer using a 12 micron K-bar.

Metric Chroma, Brilliance Index, and Opacity

The metric chroma and opacity of each print was measured using a Konica Minolta CM-26d portable sphere spectrophotometer, with the following measurement settings: D50 illuminant, 2 Grad (2° observer), in either SPEX-mode (de:8°) or SPIN-mode (di:8°). The CSCI and CSCE were measured, and the BI and CI data were calculated from these data as described above. The data tables in the examples below show the opacity, and calculated BI and CI data.

Example 1. Sample Press Inks A1 to A4

A high gloss silver special effect ink was prepared with varying concentrations of special effect additive to obtain inks A1 to A4. Ink A1-ref is the reference ink, and the relative concentration of special effect additive was set at 100%. Inks A2 to A4 each had decreasing concentrations of special effect additive relative to A1-ref. Each ink was printed as described above, and the metric chroma and brilliance index measured as described above.
  A1-ref: 100% relative concentration of special effect additive
  A2: 80% relative concentration of special effect additive
  A3: 60% relative concentration of special effect additive
  A4: 40% relative concentration of special effect additive Table 1 shows the Brilliance Index (BI) and Chroma Index (CI) data.

TABLE 1

Metric chroma of inks A1 to A4

| Ink | BI ICL no OPV | BI ICL with OPV | BI Uncoated paper | Opacity | $\Delta E_{00}$ | CI |
|---|---|---|---|---|---|---|
| A1-ref | 260.1 | 214.7 | 206.7 | 99.12 | 0 | 0 |
| A2 | 275.4 | 230.2 | 186.6 | 97.41 | 0.15 | 0.5 |
| A3 | 275.6 | 237.9 | 168.0 | 91.84 | 0.45 | 1.7 |
| A4 | 262.3 | 223.9 | 117.3 | 81.94 | 1.2 | 4.6 |

The data show that ink A2, with the concentration of special effect additive closest to the A1-ref, is the best match.

Example 2. Sample Press Inks B1 to B4

A UV high gloss silver special effect ink was prepared with varying concentrations of special effect additive. Ink B1-ref is the reference ink, and the relative concentration of special effect additive was set at 100%. Inks B2 to B4 each had decreasing concentrations of special effect additive relative to B1-ref. Each ink was printed as described above, and the metric chroma and brilliance index measured as described above.

B1-ref: 100% relative concentration of special effect additive

B2: 80% relative concentration of special effect additive

B3: 60% relative concentration of special effect additive

B4: 40% relative concentration of special effect additive

Table 2 shows the calculated BI and CI data.

TABLE 2

Metric chroma of inks B1 to B4

| Ink | BI ICL no OPV | BI ICL with OPV | BI Uncoated paper | Opacity | $\Delta E_{00}$ | CI |
|---|---|---|---|---|---|---|
| B1-ref | 668.6 | 554.4 | n/a | n/a | 0 | |
| B2 | 634.4 | 537.7 | n/a | n/a | 1.3 | 1.9 |
| B3 | 467.4 | 365.7 | n/a | n/a | 3.31 | −6.6 |
| B4 | 314.7 | 249.4 | n/a | n/a | 4.27 | −12.3 |

The data show that ink B2, having the closest concentration of special effect additive to B1-ref, is the closest match.

Example 3. Sample Press Inks C1 to C4

A standard silver special effect ink was prepared with varying concentrations of special effect additive to obtain inks C1 to C4. Ink C1-ref is the reference ink, and the relative concentration of special effect additive was set at 100%. Inks C2 to C4 each had decreasing concentrations of special effect additive relative to in C1-ref. Each ink was printed as described above, and the metric chroma and brilliance index measured as described above.

C1-ref: 100% relative concentration of special effect additive

C2: 80% relative concentration of special effect additive

C3: 60% relative concentration of special effect additive

C4: 40% relative concentration of special effect additive

The data are shown in Table 3.

TABLE 3

Metric chroma of inks C1 to C4

| Ink | BI ICL no OPV | BI ICL with OPV | BI Uncoated paper | Opacity | $\Delta E_{00}$ | CI |
|---|---|---|---|---|---|---|
| C1-ref | 288.4 | 248.0 | 296.0 | 99.07 | 0 | 0 |
| C2 | 287.1 | 252.5 | 218.5 | 98.56 | 0.69 | 0.5 |
| C3 | 271.3 | 253.1 | 160.0 | 92.85 | 1.42 | 1.8 |
| C4 | 241.1 | 227.5 | 110.2 | 84.66 | 2.33 | 4.1 |

The data show that ink C2, having the closest concentration of special effect additive to C1-ref, is the closest match.

Example 4. Sample Press Inks D1 to D4

A matte silver special effect ink was prepared with varying concentrations of special effect additive to obtain inks D1 to D4. Ink D1-ref is the reference ink, and the relative concentration of special effect additive was set at 100%. Inks D2 to D4 each had decreasing concentrations of special effect additive, relative to ink D1-ref. Each ink was printed as described above, and the metric chroma and brilliance index measured as described above.

D1-ref: 100% relative concentration of special effect additive

D2: 80% relative concentration of special effect additive

D3: 60% relative concentration of special effect additive

D4: 40% relative concentration of special effect additive

The data are shown in Table 4.

TABLE 4

Metric chroma of inks D1 to D4

| Ink | BI ICL no OPV | BI ICL with OPV | BI Uncoated paper | Opacity | $\Delta E_{00}$ | CI |
|---|---|---|---|---|---|---|
| D1-ref | 154.3 | 130.4 | 99.8 | 97.04 | 0 | 0 |
| D2 | 155.5 | 143.2 | 94.4 | 95.98 | 0.15 | 0.5 |
| D3 | 155.6 | 142.6 | 90.7 | 91.08 | 0.63 | 0.7 |
| D4 | 158.3 | 141.4 | 78.0 | 80.28 | 1.42 | 2.1 |

The data show that ink D2, having the closest concentration of special effect additive to D1-ref, is the closest match.

Example 5. Sample Press Inks E1 to E4

A fine pearl special effect ink was prepared with varying concentrations of special effect additive to obtain inks E1 to E4. Ink E1-ref is the reference ink, and the relative concentration of special effect additive was set at 100%. Inks E2 to E4 each had decreasing concentrations of special effect additive, relative to ink E1-ref. Each ink was printed as described above, and the metric chroma and brilliance index measured as described above.

E1-ref: 100% relative concentration of special effect additive

E2: 80% relative concentration of special effect additive

E3: 60% relative concentration of special effect additive

E4: 40% relative concentration of special effect additive

The data are shown in Table 5.

TABLE 5

Metric chroma of inks E1 to E4

| Ink | BI ICL no OPV | BI ICL with OPV | BI Uncoated paper | Opacity | $\Delta E_{00}$ |
|---|---|---|---|---|---|
| E1-ref | 47.9 | 69.7 | 28.9 | 58.84 | 0 |
| E2 | 49.2 | 75.5 | 22.6 | 48.49 | 1.06 |
| E3 | 51.0 | 78.2 | 17.9 | 38.84 | 1.99 |
| E4 | 51.4 | 75.5 | 13.2 | 27.60 | 3.06 |

The data show that ink E2, having the closest concentration of special effect additive to E1-ref, is the closest match.

Example 6. Sample Press Inks F1 to F4

A coarse pearl special effect ink was prepared with varying concentrations of special effect additive to obtain inks F1 to F4. Ink F1-ref is the reference ink, and the relative concentration of special effect additive was set at 100%. Inks F2 to F4 each had decreasing concentrations of special effect additive, relative to ink F1-ref. Each ink was printed as described above, and the metric chroma and brilliance index measured as described above.

F1-ref: 100% relative concentration of special effect additive
F2: 80% relative concentration of special effect additive
F3: 60% relative concentration of special effect additive
F4: 40% relative concentration of special effect additive The data are shown in Table 6.

TABLE 6

Metric chroma of inks F1 to F4

| Ink | BI ICL no OPV | BI ICL with OPV | BI Uncoated paper | Opacity | $\Delta E_{00}$ |
|---|---|---|---|---|---|
| F1-ref | 65.2 | 97.6 | 93.3 | 64.28 | 0 |
| F2 | 60.9 | 96.0 | 80.9 | 54.80 | 0.7 |
| F3 | 69.8 | 95.3 | 67.0 | 44.60 | 1.18 |
| F4 | 65.5 | 85.4 | 44.5 | 35.37 | 1.79 |

The data show that ink F2, having the closest concentration of special effect additive to F1-ref, is the closest match.

Example 7. Inks G1 to G5

A matte silver light red special effect ink was prepared with varying concentrations of special effect additive to obtain inks G1 to G5. G3 is the reference ink (G3-ref). The order of concentration of special effect additive is low to high, with G1 having the lowest concentration of special effect additive, and G5 having the highest concentration. Each ink was printed as described above, and the metric chroma and brilliance index measured as described above.

The inks were printed as described above. Table 7 shows the metric chroma and opacity for each ink.

TABLE 7

Metric chroma and opacity of inks G1 to G5

| Ink | Special effect additive wt% | BI ICL no OPV | BI ICL with OPV | BI Uncoated paper | Opacity |
|---|---|---|---|---|---|
| G1 | 5 | 167.9 | 190.3 | 54.2 | 74.77 |
| G2 | 8.33 | 176.7 | 201.4 | 71.4 | 87.68 |
| G3-ref | 10 | 172.4 | 202.8 | 78.8 | 90.29 |
| G4 | 11.67 | 161.9 | 195.6 | 83.3 | 93.03 |
| G5 | 15 | 152.9 | 188.4 | 91.7 | 96.23 |

Table 8 shows the comparison of inks G1, G2, G4, and G5 to the reference ink G3-ref.

TABLE 8

Comparison of inks G1, G2, G4, and G5 to the reference ink G3-ref

| Ink | $\Delta E_{00}$ ICL no OPV | $\Delta E_{00}$ ICL with OPV | CI ICL with OPV |
|---|---|---|---|
| G1 | 1.27 | 1.37 | 6.7 |
| G2 | 0.24 | 0.58 | 1.3 |
| G3-ref | 0 | 0 | 0 |
| G4 | 0.45 | 0.33 | −2.2 |
| G5 | 0.56 | 0.62 | −4 |

As the data show, inks G1 and G2, having a lower concentration of special effect additive than G3-ref, have a positive CI, while inks G4 and G5, having a higher concentration of special effect additive than G3-ref, have a negative CI. The data shows that sample ink G2 is the best match to reference ink G3-ref.

Example 8. Inks H1 to H5

A matte silver champagne special effect ink was prepared with varying concentrations of special effect additive to obtain inks H1 to H5. H3 is the reference ink (H3-ref). The order of concentration of special effect additive is low to high, with H1 having the lowest concentration of special effect additive, and H5 having the highest concentration. Each ink was printed as described above, and the metric chroma and brilliance index measured as described above.

The inks were printed as described above. Table 9 shows the metric chroma and opacity for each ink.

TABLE 9

Metric chroma and opacity of inks H1 to H5

| Ink | Special effect additive wt % | BI ICL no OPV | BI ICL with OPV | BI Uncoated paper | Opacity |
|---|---|---|---|---|---|
| H1 | 5 | 152.1 | 158.8 | 51.0 | 64.95 |
| H2 | 8.33 | 179.8 | 182.9 | 81.8 | 86.56 |
| H3-ref | 10 | 178.0 | 182.4 | 85.4 | 90.34 |
| H4 | 11.67 | 174.6 | 183.5 | 92.8 | 88.43 |
| H5 | 15 | 168.5 | 176.1 | 101.5 | 97.16 |

Table 10 shows the comparison of inks H1, H2, H4, and H5 to the reference ink H3-ref.

TABLE 10

Comparison of inks H1, H2, H4, and H5 to the reference ink H3-ref

| Ink | $\Delta E_{00}$ ICL no OPV | $\Delta E_{00}$ ICL with OPV | CI ICL with OPV |
|---|---|---|---|
| H1 | 2.85 | 2.47 | −1.3 |
| H2 | 0.14 | 0.16 | 0 |
| H3-ref | 0 | 0 | 0 |
| H4 | 0.35 | 0.38 | −0.2 |
| H5 | 0.78 | 1.03 | −0.6 |

The data shows that sample ink H2 is the best match to reference ink H3-ref. The data also show that if the total color difference $\Delta E00$ (without metallic) is greater than 2 color units, then the evaluation of CI may not be accurate. Therefore, to minimize the chance that the concentration of special effect additive is not accurate, it is important to match the color of the test ink with the color of the reference ink.

Example 9. Inks I1 to I5

A high gloss silver blue special effect ink was prepared with varying concentrations of silver flake pigment to obtain inks I1 to I5. I3 is the reference ink (I3-ref). The order of concentration of special effect additive is low to high, with I1 having the lowest concentration of special effect additive, and I5 having the highest concentration. Each ink was printed as described above, and the metric chroma and brilliance index measured as described above.

The inks were printed as described above. Table 11 shows the metric chroma and opacity for each ink.

TABLE 11

Metric chroma and opacity of inks I1 to I5

| Ink | Special effect additive wt % | BI ICL no OPV | BI ICL with OPV | BI Uncoated paper | Opacity |
|---|---|---|---|---|---|
| I1 | 5 | 325.0 | 369.1 | 70.3 | 81.26 |
| I2 | 8.33 | 340.9 | 379.0 | 93.8 | 90.71 |
| I3-ref | 10 | 327.5 | 375.2 | 109.6 | 87.18 |
| I4 | 11.67 | 323.7 | 379.3 | 113.6 | 91.88 |
| I5 | 15 | 281.8 | 345.8 | 132.7 | 94.97 |

Table 12 shows the comparison of inks I1, I2, I4, and I5 to the reference ink I3-ref.

TABLE 12

Comparison of inks I1, I2, I4, and I5 to the reference ink I3-ref

| Ink | $\Delta E_{00}$ ICL no OPV | $\Delta E_{00}$ ICL with OPV | CI ICL with OPV |
|---|---|---|---|
| I1 | 2.94 | 3.15 | 20 |
| I2 | 0.47 | 0.76 | 0.9 |
| I3-ref | 0 | 0 | 0 |
| I4 | 1.18 | 0.62 | −0.7 |
| I5 | 1.08 | 1 | −4.1 |

The data shows that sample ink I2 is the best match to reference ink I3-ref. Surprisingly, the assessment of CI of high gloss silver did not seem to be affected as much by the total color difference as was the CI assessment of the matte silver.

Example 10. Inks J1 to J5

A high gloss silver green special effect ink was prepared with varying concentrations of silver flake pigment to obtain inks J1 to J5. J3 is the reference ink (J3-ref). The order of concentration of special effect additive is low to high, with J1 having the lowest concentration of special effect additive, and J5 having the highest concentration. Each ink was printed as described above, and the metric chroma and brilliance index measured as described above.

The inks were printed as described above. Table 13 shows the metric chroma and opacity for each ink.

TABLE 13

Metric chroma and opacity of inks J1 to J5

| Ink | Special effect additive wt % | BI ICL no OPV | BI ICL with OPV | BI Uncoated paper | Opacity |
|---|---|---|---|---|---|
| J1 | 5 | 267.8 | 228.6 | 57.8 | 71.63 |
| J2 | 8.33 | 345.3 | 266.8 | 94.9 | 82.04 |
| J3-ref | 10 | 313.5 | 269.6 | 103.3 | 86.5 |
| J4 | 11.67 | 330.9 | 267.0 | 119.4 | 91.42 |
| J5 | 15 | 307.5 | 256.1 | 134.9 | 91.4 |

Table 14 shows the comparison of inks J1, J2, J4, and J5 to the reference ink J3-ref.

TABLE 14

Comparison of inks J1, J2, J4, and J5 to the reference ink J3-ref

| Ink | $\Delta E_{00}$ ICL no OPV | $\Delta E_{00}$ ICL with OPV | CI ICL with OPV |
|---|---|---|---|
| J1 | 1.9 | 1.44 | 17.2 |
| J2 | 0.34 | 0.43 | 3.8 |
| J3-ref | 0 | 0 | 0 |
| J4 | 0.37 | 0.37 | −4.8 |
| J5 | 0.99 | 1.14 | −12.8 |

As the data show, inks J1 and J2, having a lower concentration of special effect additive than J3-ref, have a positive CI, while inks J4 and J5, having a higher concentration of special effect additive than J3-ref, have a negative CI. The data shows that sample ink J2 is the best match to reference ink J3-ref.

Example 11. Inks K1 to K5

A fine pearl yellow special effect ink was prepared with varying concentrations of pearlescent flake pigment to obtain inks K1 to K5. K3 is the reference ink (K3-ref). The order of concentration of special effect additive is low to high, with K1 having the lowest concentration of special effect additive, and K5 having the highest concentration. Each ink was printed as described above, and the metric chroma and brilliance index measured as described above.

The inks were printed as described above. Table 15 shows the metric chroma and opacity for each ink.

TABLE 15

Metric chroma and opacity of inks K1 to K5

| Ink | Special effect additive wt % | BI ICL no OPV | BI ICL with OPV | BI Uncoated paper | Opacity |
|---|---|---|---|---|---|
| K1 | 6 | 50.1 | 94.0 | 12.1 | 30.24 |
| K2 | 10 | 55.9 | 99.2 | 17.3 | 40.87 |
| K3-ref | 12 | 57.5 | 100.7 | 19.6 | 46.0 |
| K4 | 14 | 57.2 | 99.5 | 22.4 | 48.03 |
| K5 | 15 | 57.0 | 100 | 28.1 | 56.96 |

Table 16 shows the comparison of inks K1, K2, K4, and K5 to the reference ink K3-ref.

TABLE 16

Comparison of inks K1, K2, K4, and K5 to the reference ink K3-ref

| Ink | $\Delta E_{00}$ ICL no OPV | $\Delta E_{00}$ ICL with OPV |
|---|---|---|
| K1 | 2.36 | 2.16 |
| K2 | 0.54 | 0.53 |
| K3-ref | 0 | 0 |
| K4 | 0.35 | 0.3 |
| K5 | 0.75 | 0.63 |

The data shows that sample ink K4 is the best match to reference ink K3-ref.

Example 12. Inks L1 to L5

A fine pearl light blue special effect ink was prepared with varying concentrations of pearlescent flake pigment to obtain inks L1 to L5. L3 is the reference ink (L3-ref). The order of concentration of special effect additive is low to high, with L1 having the lowest concentration of special effect additive, and L5 having the highest concentration. Each ink was printed as described above, and the metric chroma and brilliance index measured as described above.

The inks were printed as described above. Table 17 shows the metric chroma and opacity for each ink.

TABLE 17

Metric chroma and opacity of inks L1 to L5

| Ink | Special effect additive wt % | BI ICL no OPV | BI ICL with OPV | BI Uncoated paper | Opacity |
|---|---|---|---|---|---|
| L1 | 4 | 68.9 | 122.9 | 11.6 | 32.99 |
| L2 | 7.67 | 80.8 | 139.4 | 19.7 | 44.05 |
| L3-ref | 9.5 | 91.5 | 141.6 | 24.4 | 51.24 |
| L4 | 11.33 | 90.6 | 148.8 | 26.6 | 56.09 |
| L5 | 15 | 97.0 | 148.5 | 30.6 | 66.44 |

Table 18 shows the comparison of inks L1, L2, L4, and L5 to the reference ink L3-ref.

TABLE 18

Comparison of inks L1, L2, L4, and L5 to the reference ink L3-ref

| Ink | $\Delta E_{00}$ ICL no OPV | $\Delta E_{00}$ ICL with OPV |
|---|---|---|
| L1 | 1.77 | 1.56 |
| L2 | 0.49 | 0.26 |
| L3-ref | 0 | 0 |
| L4 | 0.42 | 0.34 |
| L5 | 0.6 | 0.45 |

The data shows that sample ink L2 and L4 are good matches to reference ink L3-ref.

Example 13. Inks M1 to M5

A coarse pearl beige special effect ink was prepared with varying concentrations of pearlescent flake pigment to obtain inks M1 to M5. M3 is the reference ink (M3-ref). The order of concentration of special effect additive is low to high, with M1 having the lowest concentration of special effect additive, and M5 having the highest concentration. Each ink was printed as described above, and the metric chroma and brilliance index measured as described above.

The inks were printed as described above. Table 19 shows the metric chroma and opacity for each ink.

TABLE 19

Metric chroma and opacity of inks M1 to M5

| Ink | Special effect additive wt % | BI ICL no OPV | BI ICL with OPV | BI Uncoated paper | Opacity |
|---|---|---|---|---|---|
| M1 | 4 | 55.7 | 54.5 | 28.8 | 26.51 |
| M2 | 6.67 | 64.8 | 98.9 | 43.1 | 36.55 |
| M3-ref | 8 | 69.9 | 101.8 | 52.4 | 39.63 |
| M4 | 9.33 | 76.9 | 106.2 | 59.1 | 42.79 |
| M5 | 12 | 86.4 | 84.7 | 75.3 | 50.02 |

Table 20 shows the comparison of inks M1, M2, M4, and M5 to the reference ink M3-ref.

TABLE 20

Comparison of inks M1, M2, M4, and M5 to the reference ink M3-ref

| Ink | $\Delta E_{00}$ ICL no OPV | $\Delta E_{00}$ ICL with OPV |
|---|---|---|
| M1 | 0.74 | 1.2 |
| M2 | 0.31 | 0.24 |
| M3-ref | 0 | 0 |
| M4 | 0.45 | 0.36 |
| M5 | 0.8 | 0.92 |

The data shows that sample ink M2 is the best match to reference ink M3-ref.

Example 14. Inks N1 to N5

A coarse pearl violet special effect ink was prepared with varying concentrations of pearlescent flake pigment to obtain inks N1 to N5. N3 is the reference ink (N3-ref). The order of concentration of special effect additive is low to high, with N1 having the lowest concentration of special effect additive, and N5 having the highest concentration. Each ink was printed as described above, and the metric chroma and brilliance index measured as described above.

The inks were printed as described above. Table 21 shows the metric chroma and opacity for each ink.

TABLE 21

Metric chroma and opacity of inks N1 to N5

| Ink | Special effect additive wt % | BI ICL no OPV | BI ICL with OPV | BI Uncoated paper | Opacity |
|---|---|---|---|---|---|
| N1 | 5 | 111.2 | 180.7 | 46.2 | 47.47 |
| N2 | 8.33 | 138.3 | 215.5 | 85.7 | 65.93 |
| N3-ref | 10 | 145.3 | 225.6 | 82.0 | 66.43 |
| N4 | 11.67 | 148.6 | 229.2 | 97.8 | 68.94 |
| N5 | 15 | 171.8 | 242.1 | 126.6 | 77.46 |

Table 22 shows the comparison of inks N1, N2, N4, and N5 to the reference ink N3-ref.

TABLE 22

Comparison of inks N1, N2, N4, and N5 to the reference ink N3-ref

| Ink | $\Delta E_{00}$ ICL no OPV | $\Delta E_{00}$ ICL with OPV |
|---|---|---|
| N1 | 1.84 | 1.65 |
| N2 | 0.35 | 0.22 |
| N3-ref | 0 | 0 |
| N4 | 0.38 | 0.64 |
| N5 | 0.8 | 1.01 |

The data shows that sample ink N2 is the best match to reference ink N3-ref

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A method of creating a digital rendering/simulation of a target special effect custom ink color, comprising:
   (a) providing a 3D digital display computer monitor adapted to display the design, connected to a computer having artwork visualization software installed;
   (b) providing a digital special effect library comprising a look-up table of special effect additive samples, each sample having luminous reflectance factor Y measured in the specular-included mode (YSPIN), luminous reflectance factor Y measured in the specular-excluded mode (YSPEX), and brilliance index (BI) values, wherein each special effect sample is identified with a unique identifier special effect sample code, and a visual rendering of each special effect sample is configured to be displayed on the 3D digital display; wherein the digital special effect library is produced by creating a series of special effect ink composition samples for each special effect additive, comprising:
      i. preparing a series of ink compositions at known concentrations of the special effect additive;
      ii. printing each ink composition on one or more production substrates, and uncoated paper, to produce printed special effect ink composition target prints;
      iii. assigning a unique identifier special effect sample code to each printed special effect ink composition target print, wherein each special effect ink composition is associated with a group of target prints comprising the ink printed on uncoated paper and the same ink printed on each of the production substrates;
      iv. measuring luminous reflectance factor Y in the specular-included mode (YSPINtarget) and in the specular-excluded mode (YSPEXtarget) of each special effect ink composition target print using a spherical spectrophotometer;
      v. calculating the brilliance index ($BI_{target}$) of each special effect ink composition target print according to the formula:
      vi. BItarget=[(YSPINtarget−YSPEXtarget)/YSPINtarget]×1000
      vii. storing each special effect sample code with its associated YSPIN, YSPEX, and brilliance index values to the digital special effect library; and
      viii. repeating steps (i) to (vii) for each special effect additive in the library;
   (c) providing a digital color library comprising a look-up table of color samples, wherein each color sample is a transparent color, each color sample having associated CIELAB $C^*_{ab}$ spectral reflectance data, wherein each color sample is identified with a unique color sample code, and a visual rendering of each color sample can be displayed on the 3D digital display;
   (d) wherein the computer is connected to the digital special effect library and the digital color library;
   (e) using the computer and the 3D digital display, digitally overlaying a selected color sample over a selected special effect sample; and
   (f) digitally recording the selected color sample code and selected special effect sample code; wherein the combination defines a digital target special effect custom ink color sample.

2. A method of assessing brilliance index match of a special effect ink press print to a special effect ink target print, comprising:
   (a) selecting a special effect ink target print and related special effect sample code;
   (b) obtaining a press special effect ink composition being used in a press run or in a laboratory proofing test;
   (c) printing the press special effect ink composition on uncoated paper;
   (d) measuring the luminous reflectance factor Y in the specular-included mode ($YSPIN_{press}$) and in the specular-excluded mode ($YSPEX_{press}$) of the press special effect ink composition printed on uncoated paper using a spherical spectrophotometer;
   (e) calculating the brilliance index of the press print ($BI_{press}$) according to the formula:

$BI_{press}=[(YSPIN_{press}-YSPEX_{press})/YSPIN_{press}]\times 1000$;

(f) determining whether $BI_{press}$ is within the tolerance limits of ±10% of $BI_{target}$ for matching, by calculating the brilliance index difference (ΔBI) between the press print and the target print using the following formula:

$\Delta BI=[(BI_{press}-BI_{target})/BI_{target}]\times 100$ wherein:
   the target value of ΔBI=0;
   a tolerance range for ΔBI=0±10%;
   a negative value, wherein ΔBI<−10%, indicates that the amount of special effect additive in the ink formula must be increased for printing on press; and
   a positive value, wherein ΔBI>+10%, indicates that the amount of special effect additive in the ink formula must be decreased for printing on press.

3. The method of claim 1, wherein the digital color library is PantoneLIVE/myColorCloud.

4. A method of preparing a target special effect custom color ink, comprising:
   (a) obtaining the selected color sample code and selected special effect sample code of the target special effect custom ink color using the method of claim 1;
   (b) preparing the ink color formula matching the color sample code and using the special effect ink composition matching the special effect sample code; and
   (c) mixing the ink color formula and special effect ink composition to obtain a target special effect custom color ink.

5. A method of creating a digital metric chroma record of the target special effect color sample ink, comprising:
   (a) printing the target special effect custom color sample ink of claim 4 on a selected production substrate, to obtain a printed target special effect custom color barrel proof;
   (b) using a sphere spectrophotometer to measure the metric chroma $C^*_{ab}$ in the specular-included mode ($CSCI_{target}$), and the $C^*_{ab}$ in the specular-excluded mode ($CSCE_{target}$),
   (c) digitally recording the metric chroma data for the target special effect color barrel proof in a digital look-up table.

6. A method of verifying the metric chroma match of the special effect custom color ink printed on press to the target special effect custom color ink, comprising:
   (a) taking a printed sample from a press run;
   (b) using a sphere spectrophotometer to measure the metric chroma $C^*_{ab}$ in the specular-included mode ($CSCI_{print}$) and the $C^*_{ab}$ in the specular-excluded mode ($CSCE_{print}$);
   (c) comparing the total color difference $\Delta E_{00}$ SPIN between the press print and the printed target special effect custom color, wherein:
      i. wherein a $\Delta E_{00}$ SPIN of less than or equal to ±2, is an acceptable tolerance and then proceed to step (d); but
      ii. if $\Delta E_{00}$ SPIN is greater than 2, the transparent color formula of the press ink must be adjusted;
      iii. adjusting the color of the press ink formula by repeating steps (i) to (ii) until $\Delta E_{00}$ SPIN is less than or equal to ±2;
   (d) comparing the color difference due to diffuse reflectance, ΔE SPEX, wherein:
      i. if the ΔE SPEX is also less than or equal to ±2, then the printed press sample is a match to the printed target special effect custom color and testing is complete; but
      ii. if ΔE SPEX is greater than 2, then the amount of special effect additive in the press ink must be corrected, wherein the correction required is calculated according to the following Chroma Index (CI) formula:

CI=ΔCSCE−ΔCSCI wherein:

$\Delta CSCE = CSCE_{print} - CSCE_{target}$;

$\Delta CSCI = CSCI_{print} - CSCI_{target}$ the target value of CI=0;
      a negative value for CI indicates that the amount of special effect additive in the press ink formula must be decreased; and
      a positive value for CI indicates that the amount of the special effect additive in the press ink formula must be increased; and
      iii. increasing or decreasing the amount of special effect additive in the press ink formula, and repeating step ii. until ΔCSCE is within ±10% of ΔCSCI, calculated according to:

[(ΔCSCE−ΔCSCI)/ΔCSCI]×100=0±10.

* * * * *